United States Patent
Van der Feen et al.

(10) Patent No.: US 6,296,161 B1
(45) Date of Patent: Oct. 2, 2001

(54) FASTENING SYSTEM AS WELL AS A SUITCASE PROVIDED WITH SUCH A FASTENING SYSTEM

(75) Inventors: John Ezra Van der Feen, Middelburg; Johannes Wilhelmus Maria Teurlings, Kapelle, both of (NL)

(73) Assignee: Hapro International B.V., Kapelle (NL)

( * ) Notice: Subject to any disclaimer, the term of this patent is extended or adjusted under 35 U.S.C. 154(b) by 0 days.

(21) Appl. No.: 09/388,232

(22) Filed: Sep. 1, 1999

(30) Foreign Application Priority Data

Sep. 4, 1998 (NL) .................................................. 1010008

(51) Int. Cl.⁷ ...................................................... B60R 9/00
(52) U.S. Cl. ........................................... 224/319; 224/328
(58) Field of Search ..................................... 224/319, 325, 224/326, 328, 329, 330, 331, 315

(56) References Cited

U.S. PATENT DOCUMENTS

| | | |
|---|---|---|
| 1,844,760 | 2/1932 | Haynes . |
| 2,430,649 | 11/1947 | Schulz . |
| 2,536,253 | 1/1951 | Beecher et al. . |
| 4,169,687 | 10/1979 | Schull . |
| 4,314,591 | 2/1982 | Pierrat . |
| 5,181,639 * | 1/1993 | Kvanna ................................. 224/328 |
| 5,595,410 | 1/1997 | Wilson et al. . |
| 5,928,290 * | 7/1999 | Gramnas ........................... 292/306 X |

FOREIGN PATENT DOCUMENTS

| | | |
|---|---|---|
| 42 00 937 A1 | 7/1993 | (DE) . |
| 195 26 477 C1 | 9/1996 | (DE) . |
| 196 26 482 C1 | 1/1998 | (DE) . |
| 0 601 409 A1 | 6/1994 | (EP) . |
| WO 93/22182 | 11/1993 | (WO) . |
| WO 94/04101 | 3/1994 | (WO) . |
| WO 97/11865 | 3/1997 | (WO) . |

* cited by examiner

Primary Examiner—Stephen K. Cronin
(74) Attorney, Agent, or Firm—Ladas & Parry

(57) ABSTRACT

Fastening system for attaching a suitcase to a frame, which fastening system comprises a U-shaped locking clamp positionable around the frame, which U-shaped locking clamp is provided with two legs which form locking bars and a bridge part connecting the legs, whereby on aside of the frame remote from the bridge part the locking bars are lockably located in the suitcase. The fastening system is provided with a tilting means comprising at least one contacting surface, a tiltable plate comprising a passage, which plate abuts against the contacting surface, whereby the plate by means of the tilting means is tiltable from a first position to a second position and vice versa. In the first position of the plate the locking bar is movable through the passage in said plate in the direction of insertion and in a direction opposite thereto, parallel to the central axis, whilst in the second position of the plate the central axis includes a sharp angle with the direction of insertion and the locking bar is attached to the plate.

15 Claims, 6 Drawing Sheets

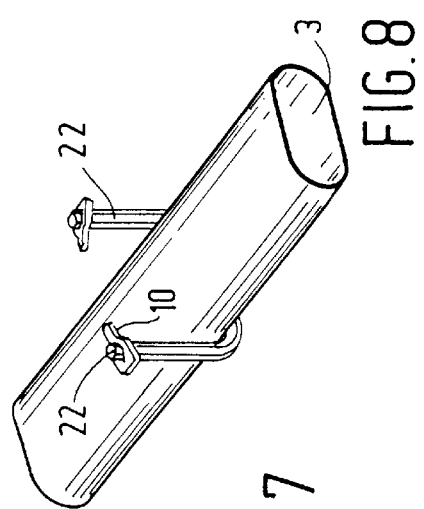
FIG. 8
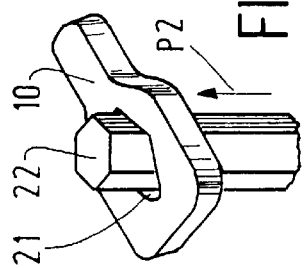
FIG. 7
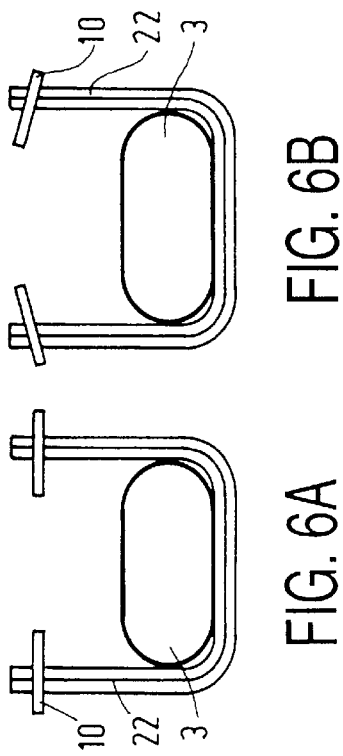
FIG. 6B
FIG. 6A

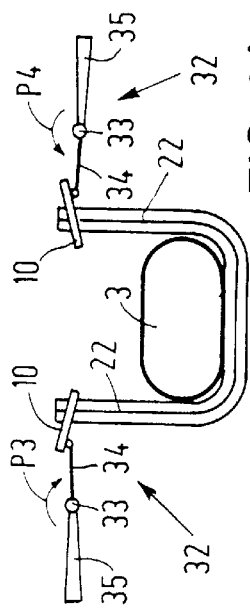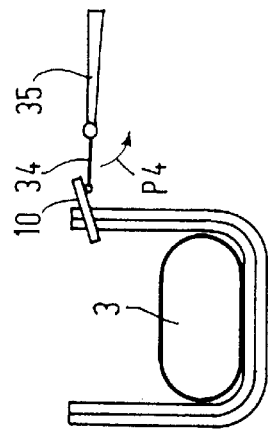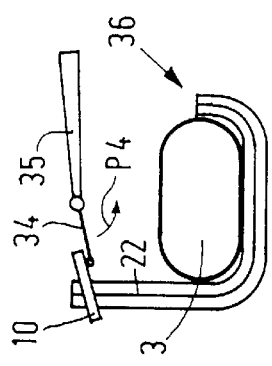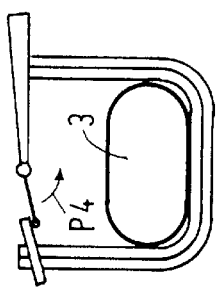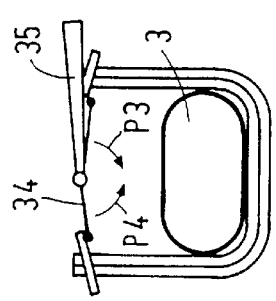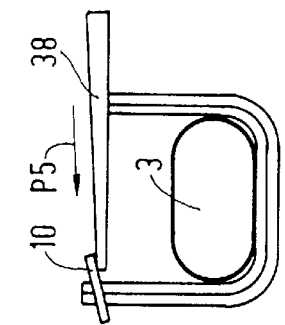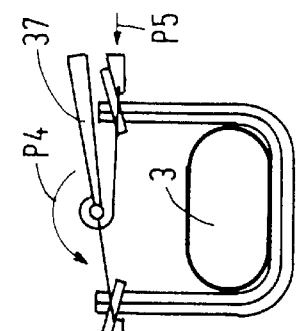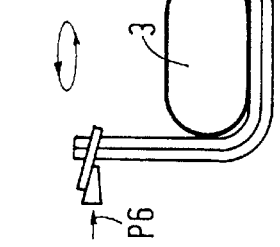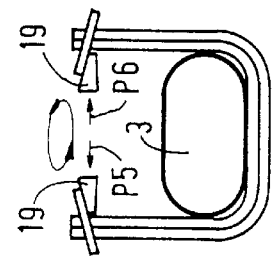

FASTENING SYSTEM AS WELL AS A SUITCASE PROVIDED WITH SUCH A FASTENING SYSTEM

The invention relates to a fastening system for attaching a suitcase to a frame, which fastening system comprises a U-shaped locking clamp positionable around the frame, which U-shaped locking clamp is provided with two legs which form locking bars and a bridge part connecting the legs, whereby on a side of the frame remote from the bridge part the locking bars are lockably located in the suitcase.

The invention furthermore relates to a suitcase which comprises such a fastening system.

With such a fastening system, which is known from German patent DE-C1-195.26.477, for attaching a suitcase to a frame present on a vehicle, the suitcase is provided with a number of regularly spaced-apart passages with legs of the U-shaped locking clamp being passed through the passages located near each other. The legs extend on either side of a tube of said frame. In the suitcase the both legs of the U-shaped locking clamp are locked undetachable with the suitcase by means of a locking mechanism.

A drawback of the known fastening system is that it has a relative complicated structure.

The object of the invention is to provide a fastening system which has a relatively simple structure and which makes it possible to realise a desired attachment in a relatively short time.

With the fastening system according to the invention this object is accomplished in that the fastening system is provided with a tilting means comprising at least one contacting surface, a tiltable plate comprising a passage, which plate abuts against the contacting surface, whereby the plate by means of the tilting means is tiltable from a first position to a second position and vice versa, whereby in the first position of the plate the locking bar is movable through the passage in said plate in the direction of insertion and in a direction opposite thereto, parallel to the central axis, whilst in the second position of the plate the central axis includes a sharp angle with the direction of insertion and the locking bar is attached to the plate.

When the locking bar is to be attached to the plate, said locking bar only needs to be passed through the passage in the plate in the direction of insertion parallel to the central axis after which the plate is titled from the first position to the second position by means of the tilting means. The tilting movement of the plate causes the locking bar to be clamped down firmly in the plate. The fastening system comprises a relatively low number of loose parts, as a result of which the risk of parts being lost is minimized.

By a force exerted on the locking bar in the second position, in the direction opposed to the direction of insertion, the plate will be pulled more firmly against the locking bar as a result of which the plate is prevented from getting loose undesirably.

An embodiment of the fastening system according to the invention is characterized in that said tilting means comprises a disc capable of pivoting movement about a pivot axis, which disc comprises at least one contacting surface sloping upwards in the circumferential direction of said disc, whilst the central axis of the passage extends parallel to the pivot axis in the first position.

By means of the disc the contacting surface can easily be displaced to tilt the plate.

Another embodiment of the fastening system according to the invention is characterized in that the disc is provided with two symmetrically located contacting surfaces and plates comprising passages, which plates abut against the contacting surfaces, whereby both legs forming locking bars are capable of movement through the passages and are lockable therein.

By pivoting the disc from the first position to the second position, the locking bars are simultaneously clamped down in the two plates. In this manner proper attachment can be quickly realised.

The invention will be explained in more detail hereafter with reference to the drawings, in which.

FIGS. 6A and B show a fastening system according to the invention in the first and the second position, respectively;

FIG. 7 shows a locking bar locked in a plate;

FIG. 8 is a perspective view of a number of components of the fastening system according to the invention; and FIGS. 9A–I show various alternative embodiments of fastening systems according to the invention.

Parts corresponding to each other are indicated by the same numerals in the figures.

Figure 1:
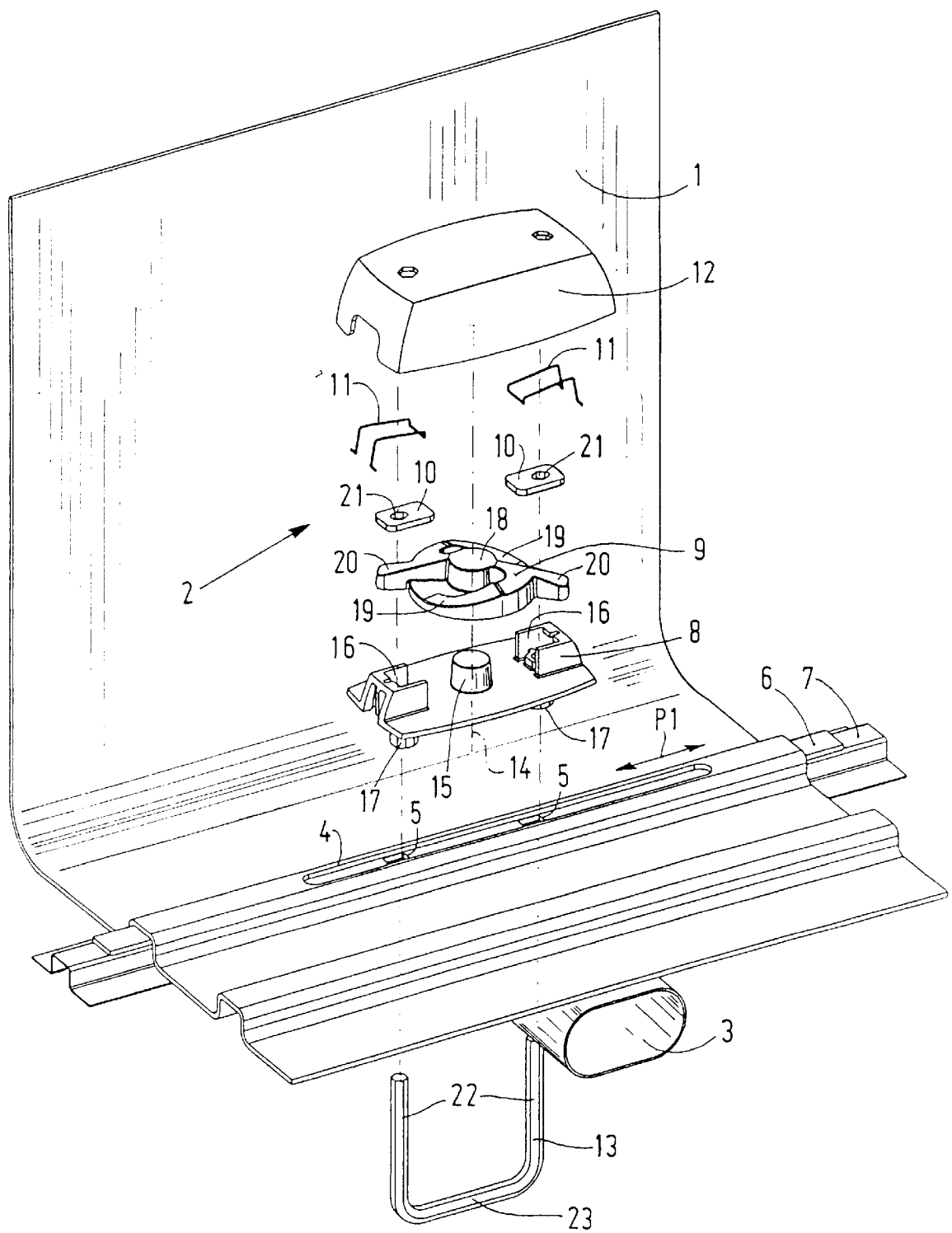
FIG. 1 is a perspective, cut-away view of a suitcase comprising a fastening system according to the invention.

FIG. 1 shows a part of a suitcase 1 according to the invention, which is attached to a tube 3 of a frame by means of a fastening system 2 according to the invention. The frame is a luggage carrier, for example, which is mounted on the roof of a vehicle. A number of fastening systems may be used, if desired.

Suitcase 1 is provided with an elongated slot 4, a strip 6 mounted under slot 4 of guide openings 5, and a supporting section 7 disposed thereunder. Supporting section 7 is likewise provided with an elongated slot (not shown), which is located opposite slot 4. Strip 6 is capable of movement relative to slot 4 in directions indicated by double arrow P1. Strip 6 provides a seal, inter alia against water.

Fastening system 2 according to the invention comprises a supporting plate 8, a disc 9, two plates 10, two springs 11, a cover 12 and a U-shaped locking clamp 13. Supporting plate 8 is provided with a projection 15 forming a pivot axis 14, over which disc 9 can be positioned. Supporting plate 8 is furthermore provided with two chamber-like recesses 16, in which the plates 10 are disposed in the assembled condition of fastening system 2. Supporting plate 8 is furthermore provided with two pawls 17, which extend in a direction away from projection 15 and which are spaced apart by a distance which equals the mutual distance between the guide openings 5.

Disc 9 comprises a central portion 18, which can be positioned over projection 15 in a manner which enables pivoting movement of disc 9 about pivot axis 14. Disc 9 comprises two contacting surfaces 19 which slope upwards in the circumferential direction of the disc, which contacting surfaces are positioned symmetrically opposite each other. Disc 9 furthermore comprises two control cams 20. Plates 10 are each provided with a passage 21, which passages are located opposite guide openings 5 in the assembled condition of the fastening system. Springs 11 are formed to press plates 10 towards supporting plate 8.

U-shaped locking clamp 13 comprises two legs 22, which are interconnected by a portion 23 which forms a bridge. Legs 22 constitute the locking bars of fastening system 2. The metal locking bars 22 are hexagonal.

Figure 2:
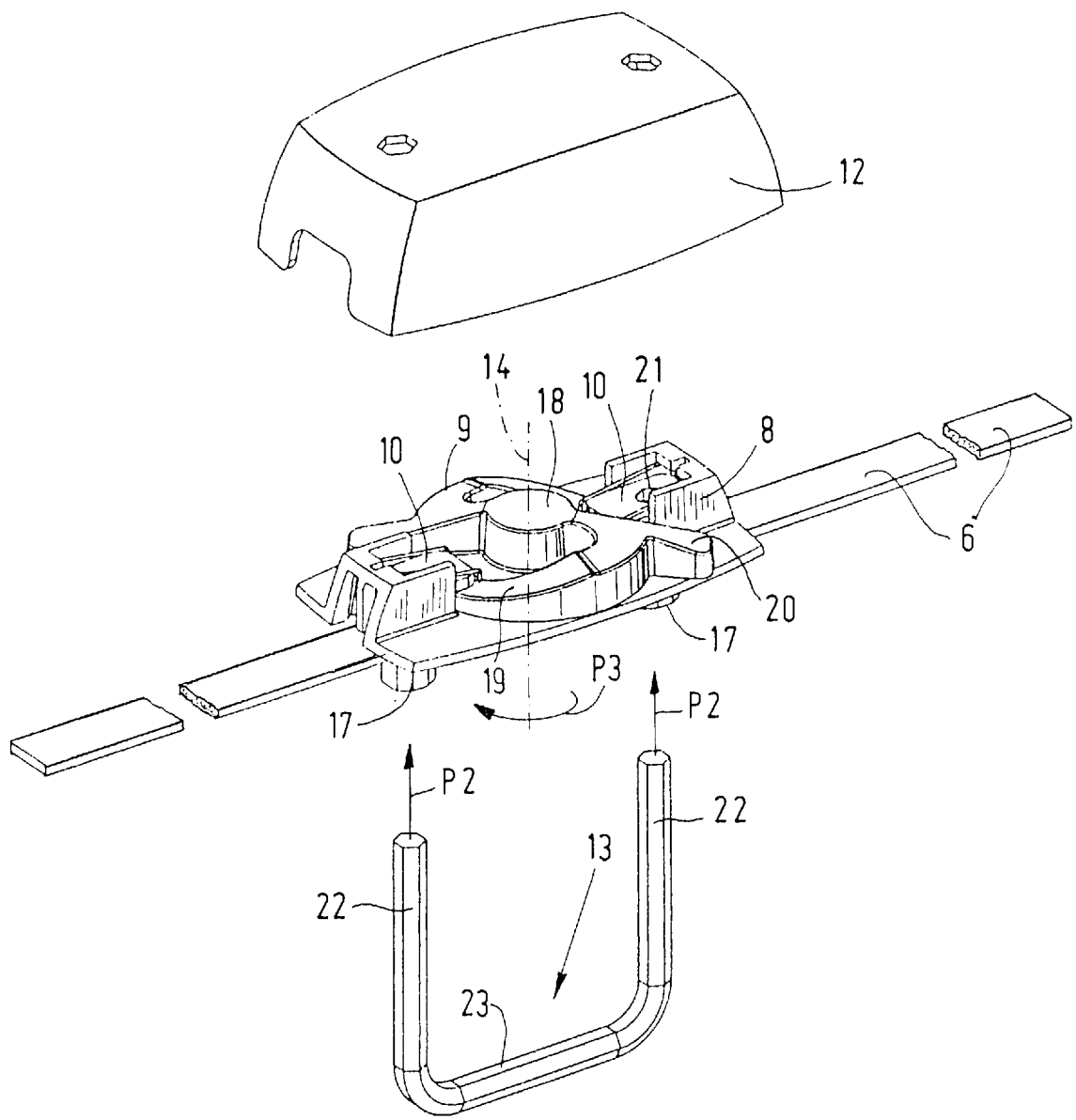
FIG. 2 is a perspective view of the fastening system according to the invention in the first position thereof.
Figure 3:
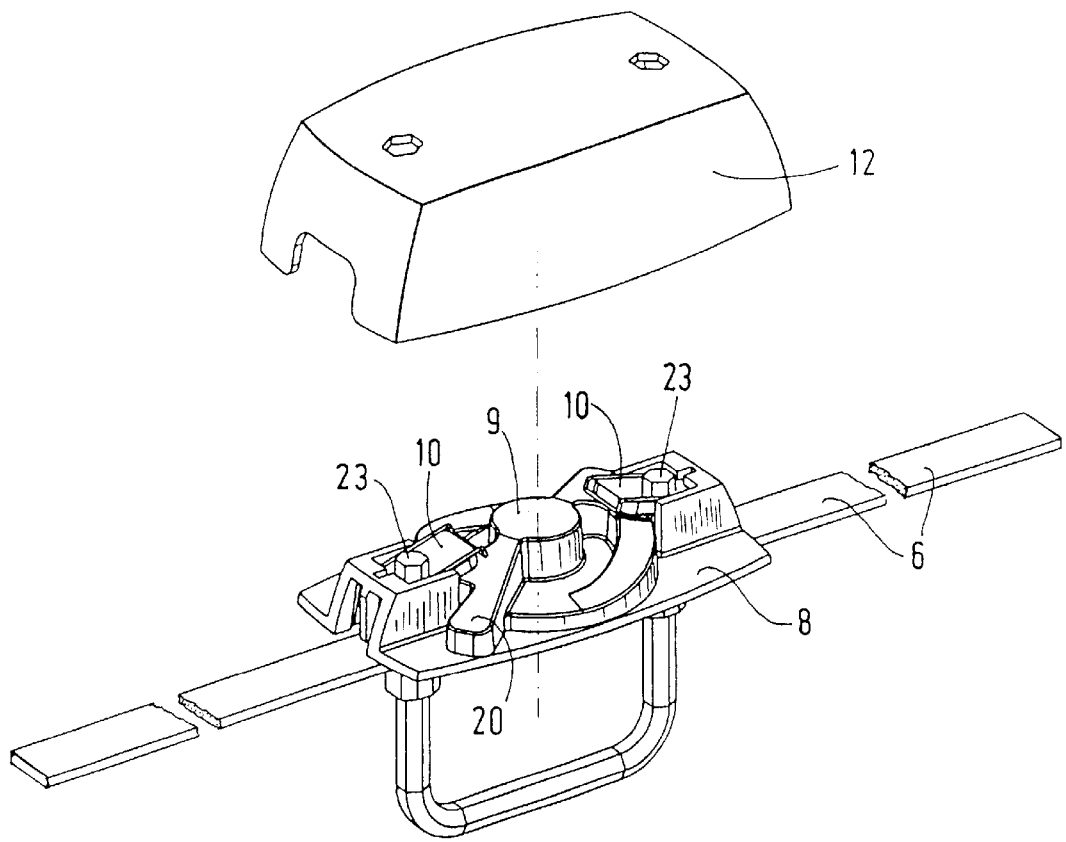
FIG. 3 is a perspective view of the fastening system according to the invention in the second position thereof.
Figure 4:
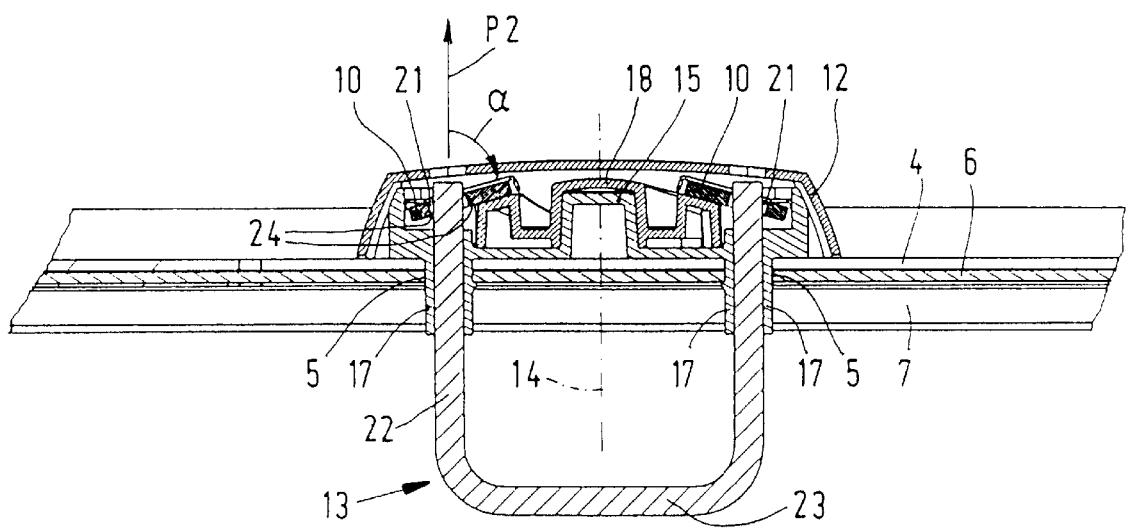
FIG. 4 is a cross-sectional view of the fastening system according to the invention, which shows said fastening system in the second position thereof.

The operation of fastening system 2 according to the invention will now be explained in more detail with reference to FIGS. 2–4. First, pawls 17 are passed through guide openings 5 in strip 6, as a result of which supporting plate 8 is connected to suitcase 1. Following that, supporting plate 8 is moved in the direction indicated by arrow P1 together with strip 6, in such a manner that the guide openings 5 are positioned on either side of tube 3. The U-shaped locking clamp 13 is placed round tube 3, whereby the two locking bars 22 are passed pawls 17 and guide openings 5 into the passages 21 in plates 10 in the direction of insertion indicated by arrow P2. Plates 10 thereby occupy a position wherein they extend substantially parallel to the strip, which is the first position (see FIG. 2). As soon as bridge portion 23 abuts against the side of tube 3 that faces away from suitcase 1, the control cams 20 of disc 9 will be taken hold of and disc 9 will be pivoted in the direction indicated by arrow P3. The upwardly sloping contacting surfaces 19 are thereby moved under plates 10, whereby the upwardly sloping contacting surfaces 19 cause plates 10 to tilt about an axis extending substantially transversely to pivot axis 14 to the second position as shown in FIGS. 3 and 4. In this second position, locking bars 22 are locked in position in passage 21 in plates 10. Then cover 12 is positioned over disc 9 and supporting plate 8. Cover 12 will hold the control cams 20 in the position as shown in FIG. 3, thus preventing the fastening system 2 from becoming detached undesirably. Cover 12 also screens disc 9 and the plates 10 positioned on top of said disc from the luggage to be placed into suitcase 1.

FIG. 4 shows a cross-sectional view of the fastening system 2 according to the invention in the second, locked position, whereby the figure clearly shows locking bar 22 to clampingly abut against edges 24 of passage 21. Plate 10 includes an acute angle α with the direction of insertion indicated by arrow P2. As a result of this acute angle α, a force exerted on locking bar 22 in a direction opposed to the direction indicated by arrow P2 will cause plate 10 to attempt to tilt further, as a result of which the edges 24 are pressed more firmly against locking bar 22.

Figure 5:
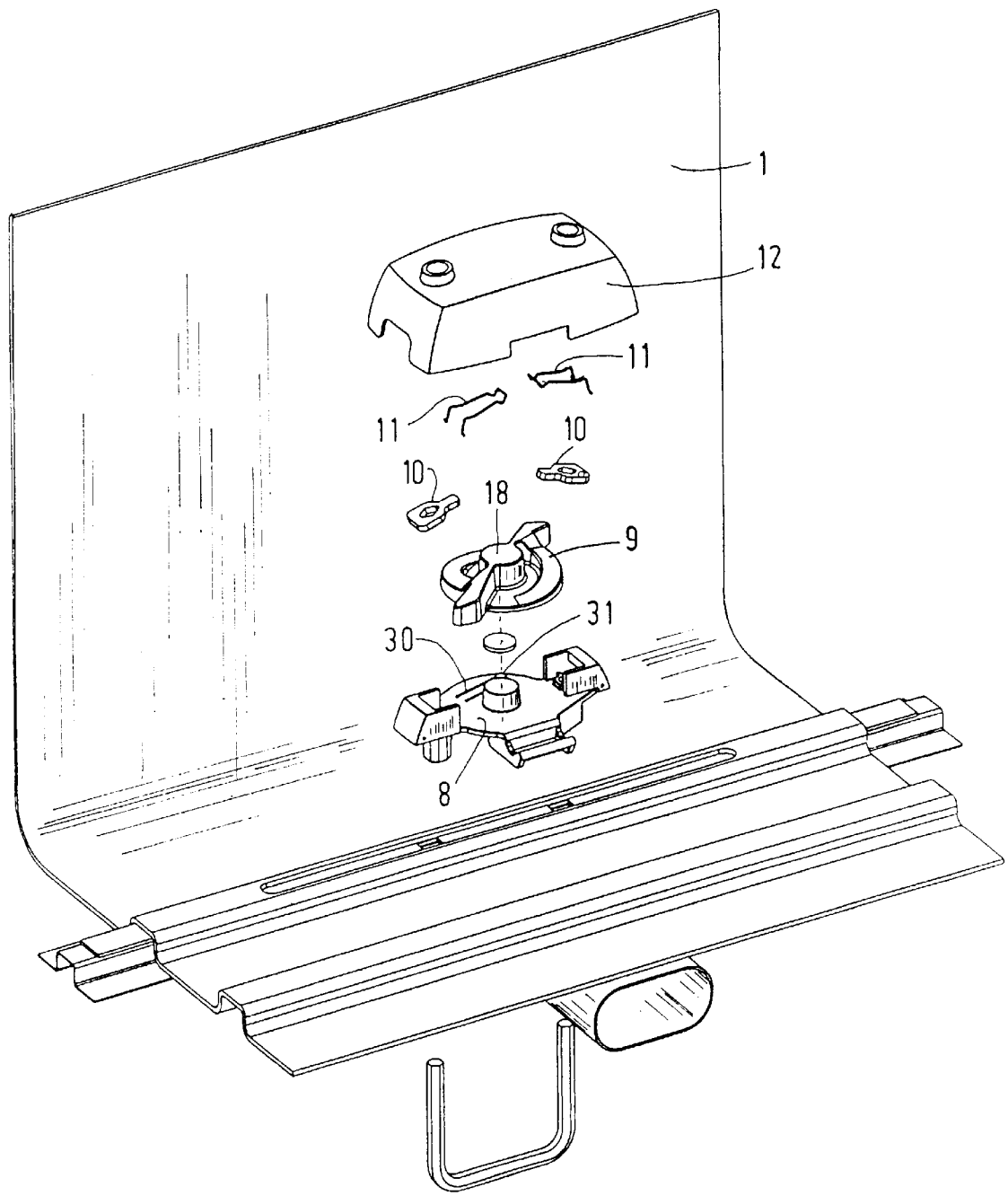
FIG. 5 is a perspective view of a suitcase comprising a second embodiment of a fastening system according to the invention.

FIG. 5 shows an embodiment of the fastening system according to the invention which largely corresponds to the fastening system as shown in FIGS. 1–4. The fastening system as shown in FIG. 5 is different from the above-described fastening system, however, in that it comprises a spring element 30 having a spherical end 31, which is disposed in disc 8. Disc 9 is provided with a recess (not shown), in which said spherical element 31 is disposed in the second position of disc 9. Disc 9 is locked in the second position by means of spherical element 31, therefore.

FIGS. 6A and 6B show plates 10 in, respectively, a horizontal, first position and a second position, in which they extend at an angle.

FIG. 7 shows plate 10 is a second position, in which it extends at an angle, in which position locking bar 22 is locked in position in plate 10.

FIG. 8 is a perspective view of a number of components of the fastening system according to the invention.

FIGS. 9A–I show various alternative embodiments for effecting tilting movement of plate 10 from a horizontal, first position to a second position, in which it extends at an angle. FIGS. 9A–I all show the second position. In FIG. 9A the fastening system is provided on either side of the U-shaped clamp with levers 32, which are pivotable about lever axes 33 in the directions indicated by arrows P3, P4. Each lever 32 comprises an arm 34, which abuts against plate 10, and an operating arm 35. Pivoting of levers 32 causes plates 10 to tilt from the first to the second position, and vice versa.

FIGS. 9B–E show, respectively, a single lever comprising two arms 34 abutting against plates 10, a U-shaped clamp comprising a single plate 10, a J-shaped yoke 36 and another U-shaped clamp comprising a single plate 10.

With the embodiments of the fastening system according to the invention as shown in FIGS. 9F–I, contacting surfaces 19 are moved in the directions indicated by arrows P5, P6 by means of, respectively, a pivotable disc, a lifting mechanism 37 or a movable element 38.

It is also possible to use different locking bars, for example J-shaped locking bars, which are provided with flanges which engage round tube 3. It is also possible for disc 9 to have only one contacting surface 19.

It is also possible to make the locking bar square, octagonal or round. It is also possible to lock disc 9 in the second position in a manner which is different from that which is shown in the figures.

It is also possible to use the fastening system for detachably interconnecting two components, such as bicycle carriers, ski carriers, canoes, stand components, for example.

What is claimed is:

1. A fastening system for attaching a suitcase to a frame, said fastening system comprising:
   (a) a U-shaped locking clamp positionable around the frame, said U-shaped locking clamp being provided with:
      (a1) two legs which form locking bars; and
      (a2) a bridge part connecting the legs,
   whereby on a side of the frame remote from the bridge part the locking bars are lockable located in the suitcase, the fastening system being provided with a tilting element, comprising at least one contacting surface, a tiltable plate comprising a passage, said tiltable plate abutting against said contacting surface, whereby the tiltable plate by means of the tilting element is tiltable from a first position to a second position and vice versa, whereby in the first position of the plate the locking bar is movable through the passage in said plate in a direction of insertion and in a direction opposite thereto, parallel to a central axis, while in the second position of the plate the central axis includes a sharp angle with the direction of insertion and the locking bar is attached to the plate.

2. The fastening system according to claim 1, the tilting element comprising disc capable of pivoting movement about a pivot axis, which disc comprises at least one contacting surface sloping upwards in the circumferential direction of said disc, whilst the central axis of the passage extends parallel to the pivot axis in the first position.

3. The fastening system according to claim 2, the disc being provided with two symmetrically located contacting surfaces and plates comprising passages, which plates abut against the contacting surfaces, whereby both legs forming locking bars are capable of movement through the passages and are lockable therein.

4. The fastening system according to claim 1, further comprising a spring which presses said plate against said contacting surface.

5. The fastening system according claim 1, further comprising a cover.

6. The fastening system according to claim 5, wherein said plate can be fixed in said second position by means of said cover.

7. A suitcase comprising the fastening system according to claim 1.

8. The suitcase according to claim 7, said suitcase being provided with an elongated slot, with respect to which said fastening system is movable, wherein said fastening system further comprises an elongated strip which is provided with guide opening disposed opposite the passage present in said plate.

9. A fastening system for attaching a suitcase to a frame, said fastening system comprising:
   (a) a U-shaped locking clamp positionable around the frame, said U-shaped locking clamp being provided with:
      (a1) two legs which form locking bars; and
      (a2) a bridge part connecting the legs,
   whereby on a side of the frame remote from the bridge part the locking bars are lockably located in the suitcase; and
   (b) a tilting element, comprising:
      (b1) a disk capable of pivoting movement about a pivot axis, said disk further comprising at least one contacting surface sloping upwards in a circumferential direction of said disk; and
      (b2) a tiltable plate comprising a passage, said tiltable plate abutting against said contacting surface,
   whereby the tiltable plate by means of rotating the tilting element about the pivot axis is tiltable from a first position to a second position and vice versa, whereby a central axis of the passage extends parallel to the pivot axis in the first position so that the locking bar is movable through the passage in said plate in direction of insertion and in direction opposite thereto, parallel to the central axis, while in the second position of the plate the central axis includes a sharp angle with the direction of insertion and the locking bar is attached to the plate.

10. The fastening system according to claim 9, said disk being provided with two symmetrically located contacting surfaces and plates comprising passages, said plates abutting against the contacting surfaces, whereby both legs forming said locking bars are capable of movement through the passages and are lockable therein.

11. The fastening system according to claim 9, further comprising a spring which presses said plate against said contacting surface.

12. The fastening system according to claim 9, further comprising a cover.

13. The fastening system according to claim 12, wherein said plate can be fixed in said second position by using said cover.

14. A suitcase comprising the fastening system according to claim 9.

15. The suitcase according to claim 14, said suitcase being provided with an elongated slot, with respect to which said fastening system is movable, wherein said fastening system further comprises an elongated strip which is provided with guide openings disposed opposite the passage present in said plate.

\* \* \* \* \*